June 29, 1937.  J. MERCIER  2,085,454
AXLE TORQUE PREVENTING DEVICE
Original Filed June 22, 1933
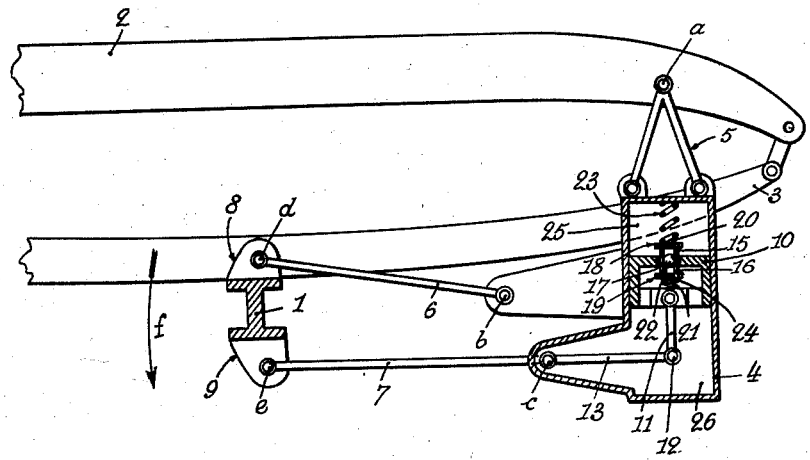
Jean Mercier
INVENTOR Patented June 29, 1937

2,085,454

UNITED STATES PATENT OFFICE 2,085,454

AXLE TORQUE PREVENTING DEVICE

Jean Mercier, Neuilly sur Seine, France

Original application June 22, 1933, Serial No. 677,071. Divided and this application December 26, 1934, Serial No. 759,203. In France July 5, 1932

6 Claims. (Cl. 267—67)

The present invention, which is a division of my copending application Serial No. 677,071 filed June 22, 1933, has for its object a device for preventing the rotation or the torsion of a stationary member, such as an axle or a false hub of a motor vehicle, under the action of a power couple or a braking couple exerted upon the said stationary member. For this purpose, according to the invention, two links of unequal lengths are pivoted to the said stationary member, at one of their ends, at two points which are at a distance from each other, said points being situated substantially in a plane which is parallel with the couple which is to be resisted, and at their other ends, to a second member which is secured to the vehicle. Said arrangement is useful in order to oppose the raising or lowering of the front or the rear of the vehicle frame either under the action of a power couple or under the action of a braking couple.

Further characteristics and advantages of the invention will be set forth in the following description.

The accompanying drawing represents diagrammatically, by way of example, a form of execution of the invention as applied to a motor vehicle.

In this example, 1 is the axle of the vehicle, 2 a side-beam of the chassis, and 3 the usual suspension spring, mounted between the axle 1 and the side-beam 2. A rigid member of any kind, 4, which in the example represented is the cylinder of a shock-absorber, is secured to the side-beam 2, for instance by rods 5. The member 4 is also connected, by two links 6 and 7, of unequal lengths which may be parallel or not, to two forked brackets 8—9 mounted on the axle 1. The attaching connections abcde consist of pivots, and may have the form of ball-and-socket joints, cylindrical axles, or other devices of an equivalent nature.

In the cylinder 4 containing a gaseous or liquid fluid is slidable a piston 10 whose rod 11 is pivoted at 12 to a crank-arm 13 mounted on the pivot axle c. The shock-absorber device, in itself, does not constitute the object of the invention; it may be of any type, for instance of a type disclosed in my copending application 677,071. The piston 10 is pierced with a hole through which is slidable a lantern member 15 provided with longitudinal apertures 16 and 17. Said lantern member 15 is provided at its ends with two discs 18 and 19 pierced with apertures 20 and 21. A ball 22 arranged in the member 15, is adapted to close either of the apertures 20 and 21. A spring 23 bears on the disc 18 and on the cylinder 4 and a spring 24 bears on the disc 19 and on the piston 10. When under the effect of an impact, the axle 1 rises or descends with reference to the side-beam 2, the rod 7 will turn on the pivot c, thus turning the crank-arm 13, in such way as to lower or to raise the piston 10. When the piston 10 rises it bears against the disc 18 and drives with itself said disc 18 and the member 15 and the fluid passes freely from the chamber 25 into the chamber 26 through the apertures 20, 16, 17, and the spring 23 is compressed. When the piston returns to its initial position, the fluid may flow from the chamber 26 into the chamber 25 only by raising the lantern member 15 against the action of the compressed spring 23, whereby rebounding is prevented. An analogous operation occurs when the piston 10 is lowered under the effect of a shock.

If the stress of the power or the stress of the braking acts upon the axle, with a tendency to twist the axle in the direction of the arrow $f$, the link 7, which operates by compression, will tend to repel the member 4 to the right of the figure, but on the contrary, the link 6 which operates by traction will oppose this movement, and will tend to maintain the axle 1 in its original state. The effect will be the same, if the power stress or the braking stress should tend to twist the axle in the contrary direction to the arrow $f$; in this case the link 6 will operate by compression, and the link 7, by traction. Owing to this arrangement, one will also avoid bringing the torsion couple upon the suspension spring 3. It will be noted that the distance between the pivots $b$ and $c$ may be as great or as small as may be desired. These two pivots may even be combined in a single one. Moreover, the links 6 and 7 being unequal, the couple imparted by the member 1 to the member 4 will bring upon the member 4 an additional component force which tends to raise or lower the chassis 2 with reference to the axle.

The invention is evidently not limited to the form of execution described, which has been chosen only by way of example; it is also applicable to the case of independent wheels.

Having now described my invention what I claim as new and desire to secure by Letters Patent is:

1. A device comprising in combination, a first member of the non-suspended part of a motor vehicle adapted to be twisted or rotated by a torsion couple, a second member pivoted to the suspended part of said vehicle, and two links of unequal lengths pivoted at one end to said first member at two points which are spaced apart and are situated substantially in a plane parallel to the plane of the couple to be resisted, and at their other ends to said second member.

2. A device comprising in combination, a first member of the non-suspended part of a motor vehicle adapted to be twisted or rotated by a torsion couple, a second member pivoted to the suspended part of said vehicle and two links of unequal lengths and not parallel pivoted at one end to said first member at two points which are spaced apart and are situated substantially in a plane parallel to the plane of the couple to be resisted and at their other ends to said second member.

3. A device comprising in combination an axle of a motor vehicle adapted to be twisted or rotated by a torsion couple, a member pivoted to the suspended part of said vehicle, and two links of unequal lengths pivoted at one end to said axle at two points which are spaced apart and are situated substantially in a plane parallel to the plane of the couple to be resisted, and at their other ends to said member.

4. A device comprising in combination an axle of a motor vehicle adapted to be twisted or rotated by a torsion couple, a member pivoted to the suspended part of said vehicle, and two links of unequal lengths and not parallel pivoted at one end to said axle at two points which are spaced apart and are situated substantially in a plane parallel to the plane of the couple to be resisted, and at their other ends to said member.

5. A device comprising in combination an axle of a motor vehicle adapted to be twisted or rotated by a torsion couple, a member of the suspended part of the vehicle, a cylinder connected to said member and containing a fluid, a pivoting stud rotatably supported on said cylinder, a piston adapted to be reciprocated in said cylinder and connected to said stud, and two links of unequal lengths pivotally connected at one end respectively with said stud and with said member and at their other ends with said axle.

6. In combination with a vehicle, a suspended member and a wheel axle, a pair of links of unequal length pivoted at one end to spaced points of said axle and located substantially in a plane parallel to the plane of a wheel adapted to be mounted on said axle, and means for snubbing the vertical movement of the wheel, said means being pivotally connected with the opposite ends of said links of unequal length, and with the suspended part of said vehicle for allowing movements of the wheel with respect to the suspended part other than movements in a vertical direction.

JEAN MERCIER.